(12) United States Patent
Shreepathi Bhat et al.

(10) Patent No.: US 11,556,143 B2
(45) Date of Patent: Jan. 17, 2023

(54) LINE TRANSIENT IMPROVEMENT THROUGH THRESHOLD VOLTAGE MODULATION OF BUFFER-FET IN LINEAR REGULATORS

(71) Applicant: TEXAS INSTRUMENTS INCORPORATED, Dallas, TX (US)

(72) Inventors: Avinash Shreepathi Bhat, Tucson, AZ (US); Chizim Obinuchi Okpara, Tucson, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/061,069

(22) Filed: Oct. 1, 2020

(65) Prior Publication Data

US 2021/0096587 A1 Apr. 1, 2021

Related U.S. Application Data

(60) Provisional application No. 62/909,009, filed on Oct. 1, 2019.

(51) Int. Cl.
*G05F 1/575* (2006.01)
*G05F 1/59* (2006.01)
*H02J 7/00* (2006.01)

(52) U.S. Cl.
CPC .............. *G05F 1/575* (2013.01); *G05F 1/59* (2013.01); *H02J 7/007* (2013.01); *H02J 2207/20* (2020.01)

(58) Field of Classification Search
CPC .................................. G05F 1/575; G05F 1/59
See application file for complete search history.

(56) References Cited

U.S. PATENT DOCUMENTS

| | | | | |
|---|---|---|---|---|
| 6,518,737 B1* | 2/2003 | Stanescu | ................. | G05F 1/575 323/280 |
| 7,142,044 B2* | 11/2006 | Sano | ....................... | G05F 1/575 327/540 |
| 7,576,524 B2* | 8/2009 | Ohoka | ..................... | G05F 1/573 323/275 |
| 7,589,507 B2* | 9/2009 | Mandal | .................... | G05F 1/575 323/270 |
| 8,080,983 B2* | 12/2011 | Lourens | .................. | G05F 1/575 323/275 |
| 8,334,681 B2* | 12/2012 | Arigliano | ................ | G05F 1/563 323/282 |
| 2003/0111986 A1* | 6/2003 | Xi | ........................... | G05F 1/575 323/280 |
| 2006/0170401 A1* | 8/2006 | Chen | ....................... | G05F 1/569 323/273 |
| 2007/0057660 A1* | 3/2007 | Lin | .......................... | G05F 1/575 323/316 |

(Continued)

*Primary Examiner* — Sisay G Tiku
(74) *Attorney, Agent, or Firm* — Brian D. Graham; Frank D. Cimino

(57) ABSTRACT

A linear regulator includes a pass transistor, a buffer transistor, and a low-pass filter circuit. The pass transistor is configured to pass a current from an input terminal to an output terminal. The buffer transistor is coupled to the input terminal and the pass transistor, and is configured to control the pass transistor. The low-pass filter circuit is coupled to the input terminal and the buffer transistor, and is configured to modulate a threshold voltage of the buffer transistor responsive to a transient at the input terminal.

18 Claims, 8 Drawing Sheets

(56) References Cited

U.S. PATENT DOCUMENTS

| | | | |
|---|---|---|---|
| 2008/0197829 A1* | 8/2008 | Nagata | G05F 3/262 |
| | | | 323/316 |
| 2010/0253431 A1* | 10/2010 | Fujiwara | G05F 1/575 |
| | | | 330/253 |
| 2012/0242307 A1* | 9/2012 | Higuchi | H02M 3/156 |
| | | | 323/273 |
| 2013/0113447 A1* | 5/2013 | Kadanka | G05F 1/56 |
| | | | 323/280 |
| 2013/0134952 A1* | 5/2013 | Imura | G05F 1/575 |
| | | | 323/280 |
| 2015/0015223 A1* | 1/2015 | Chen | G05F 1/575 |
| | | | 323/280 |
| 2015/0212530 A1* | 7/2015 | Forejtek | G05F 1/56 |
| | | | 323/280 |
| 2016/0036432 A1* | 2/2016 | Dhamdhere | H03K 17/302 |
| | | | 323/271 |
| 2016/0179115 A1* | 6/2016 | Kronmueller | H03F 3/21 |
| | | | 323/280 |
| 2017/0090493 A1* | 3/2017 | Cui | G05F 1/575 |
| 2020/0272186 A1* | 8/2020 | Inoue | B60R 16/033 |
| 2020/0285262 A1* | 9/2020 | Kunz | H03K 19/21 |
| 2021/0080985 A1* | 3/2021 | Shreepathi Bhat | G05F 1/565 |
| 2021/0080986 A1* | 3/2021 | Shreepathi Bhat | G05F 1/468 |

* cited by examiner

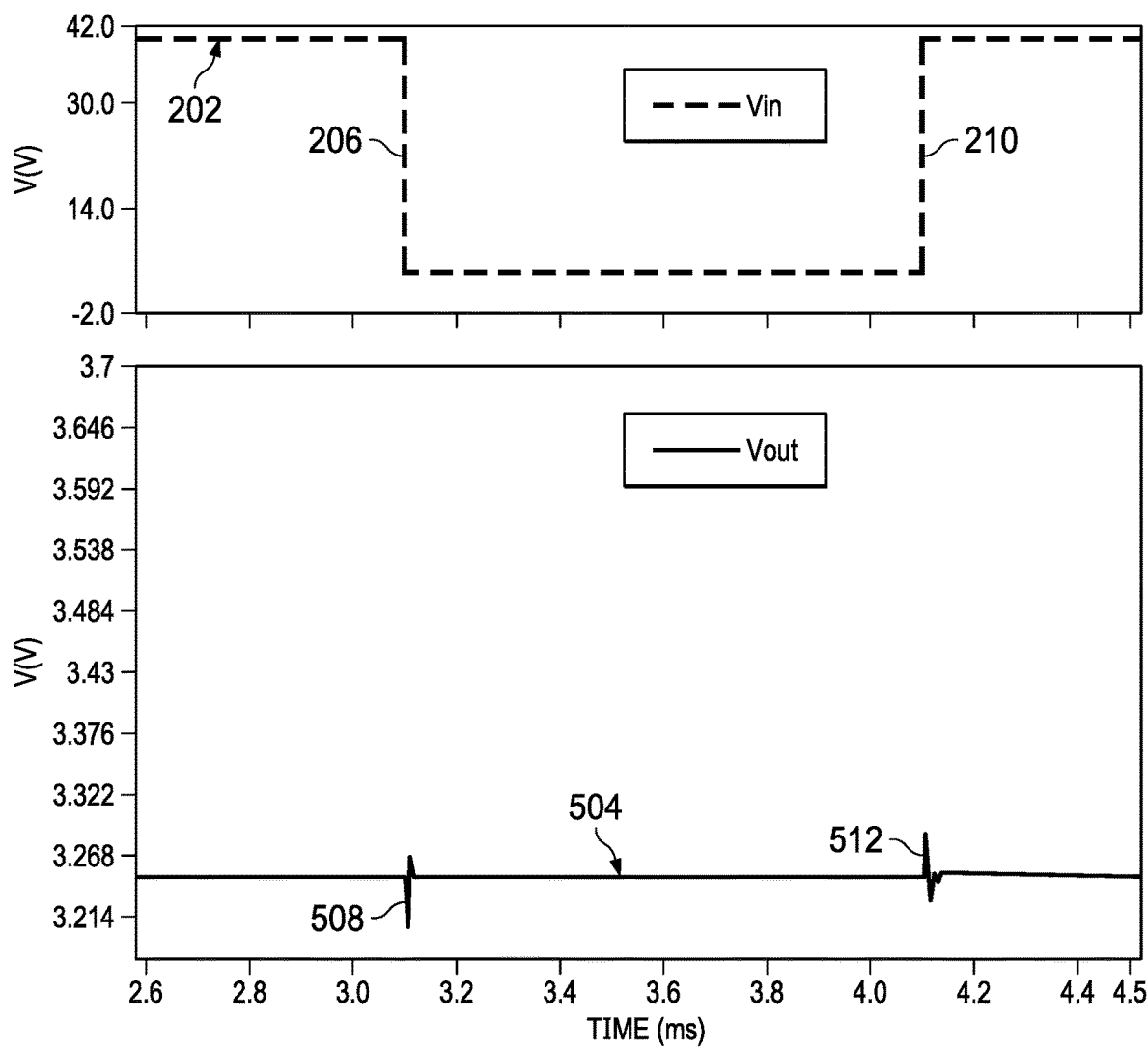

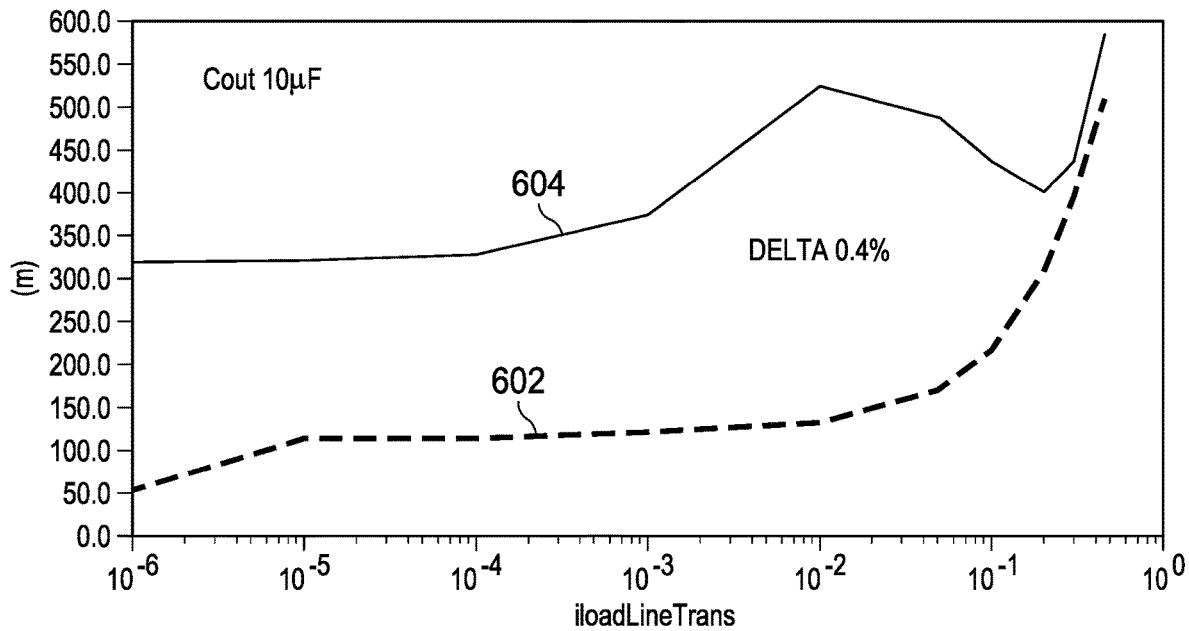
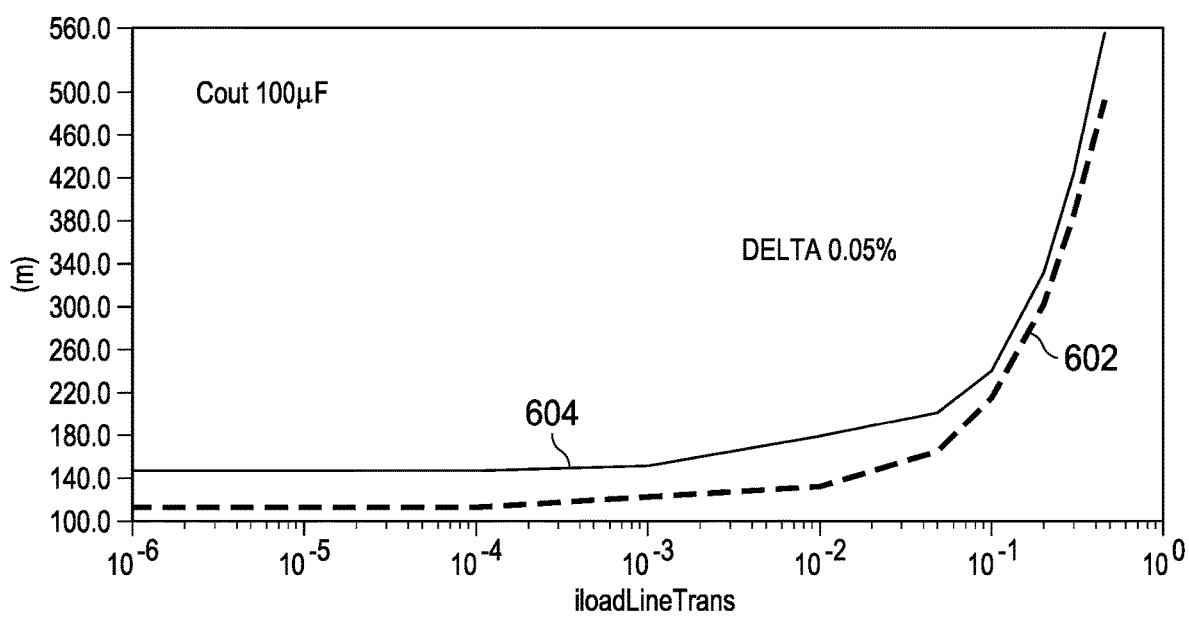

LINE TRANSIENT IMPROVEMENT THROUGH THRESHOLD VOLTAGE MODULATION OF BUFFER-FET IN LINEAR REGULATORS

CROSS-REFERENCE TO RELATED APPLICATION

This application claims priority to U.S. Provisional Application No. 62/909,009, filed Oct. 1, 2019, entitled "Linear Regulator with Threshold Voltage Modulation of Driver Transistor," which is hereby incorporated herein by reference in its entirety.

BACKGROUND

A low dropout or LDO linear voltage regulator is an electronic circuit that is designed to provide a stable DC output voltage regardless of input voltage variations and bad impedance. An LDO linear voltage regulator is able to maintain output regulation even for a relatively small difference between the input voltage and the output voltage. For example, when regulating the voltage from a battery, an LDO regulator can maintain a steady output voltage for input voltages ranging from high battery voltages down to voltage levels just above the output voltage.

SUMMARY

In one example, a linear regulator includes a pass transistor, a buffer transistor, and a low-pass filter. The pass transistor includes a first terminal, a second terminal, and a third terminal. The first terminal is coupled to an input terminal. The second terminal is coupled to an output terminal. The buffer transistor includes a first terminal, a second terminal, a third terminal, and a fourth terminal. The first terminal of the buffer transistor is coupled to the input terminal. The third terminal of the buffer transistor is coupled to the second terminal of the buffer transistor and the third terminal of the pass transistor. The low-pass filter circuit is coupled to the input terminal, the third terminal of the buffer transistor, and the fourth terminal of the buffer transistor.

In another example, a linear regulator includes a pass transistor, a buffer transistor, and a low-pass filter circuit. The pass transistor is configured to pass a current from an input terminal to an output terminal. The buffer transistor is coupled to the input terminal and the pass transistor, and is configured to control the pass transistor. The low-pass filter circuit is coupled to the input terminal and the buffer transistor, and is configured to modulate a threshold voltage of the buffer transistor responsive to a transient at the input terminal.

In a further example, a power system includes a load circuit and a voltage regulator. The voltage regulator includes an input terminal, an output terminal, a pass transistor, a buffer transistor, and a low-pass filter circuit. The input terminal of the voltage regulator is adapted to be coupled to a battery. The output terminal of the voltage regulator is coupled to the load circuit. The pass transistor includes a first terminal, a second terminal and a third terminal. The first terminal is coupled to the input terminal. The second terminal is coupled to the output terminal. The buffer transistor includes a first terminal, a second terminal, a third terminal, and a fourth terminal. The first terminal of the buffer transistor is coupled to the input terminal. The third terminal of the buffer transistor is coupled to the second terminal of the buffer transistor and the third terminal of the pass transistor. The low-pass filter circuit is coupled to the input terminal, the third terminal of the buffer transistor, and the fourth terminal of the buffer transistor.

BRIEF DESCRIPTION OF THE DRAWINGS

FIG. 5 is a graph of output of the linear voltage regulators of FIGS. 3 and 4 responsive to a power supply transient.

FIGS. 6A-6D show comparisons of line transient overshoot in the linear voltage regulators of FIGS. 3 and 4 to a linear voltage regulator that lacks threshold voltage modulation.

DETAILED DESCRIPTION

Supply rejection, which is the ability to reject noise from the power supply, is one important characteristic of a low drop out (LDO) linear voltage regulator. The supply rejection of some LDO linear voltage regulators depends on the loop gain of the regulator. Because loop stability limits the available loop gain, high supply rejection can be difficult to achieve at high frequency due to the limited loop gain. As a result, some linear voltage regulators exhibit poor performance with respect to high-speed power supply transients.

Figure 1:
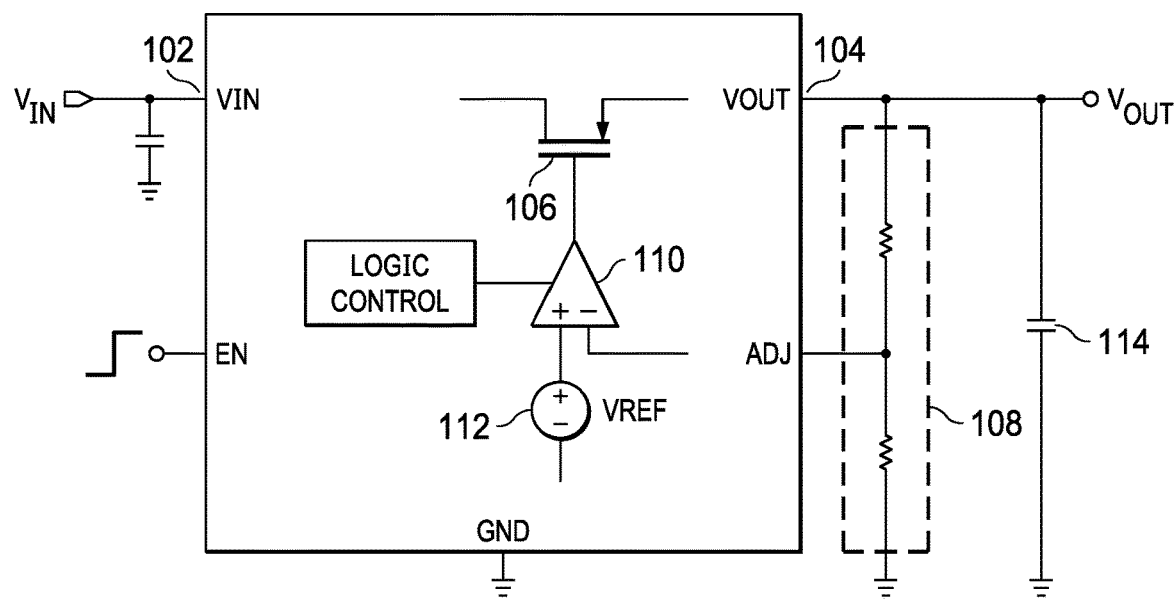
FIG. 1 is a block diagram of a linear voltage regulator circuit.

FIG. 1 is a block diagram of a linear voltage regulator circuit 100. The linear voltage regulator circuit 100 includes an input terminal 102, an output terminal 104, a pass transistor 106, a voltage divider 108, an error amplifier 110, and a reference voltage circuit 112. The input terminal 102 provides connection to a power source, such as a battery, and the output terminal 104 provides connection to a load circuit to be powered by the output of the linear voltage regulator circuit 100. The pass transistor 106 is coupled to the input terminal 102 and the output terminal 104, and passes current from the input terminal 102 to the output terminal 104.

The voltage divider 108 is coupled to the output terminal 104, and divides the voltage at the output terminal 104 for application to the error amplifier 110. For example, the output terminal 104 divides the voltage at the output terminal 104 to produce a voltage that is approximately the reference voltage generated by the reference voltage circuit 112 when the voltage at the output terminal 104 is a desired voltage. The reference voltage circuit 112 may include a bandgap circuit to generate the reference voltage. The error amplifier 110 is coupled to the pass transistor 106, and generates an error voltage to control the pass transistor 106. The error voltage is based on a difference of the voltage produced by the voltage divider 108 and the reference voltage generated by the reference voltage circuit 112.

In the linear voltage regulator circuit 100, time to respond to a transient at the input terminal 102 is the response time of the control loop that includes the pass transistor 106, the voltage divider 108, and the error amplifier 110.

Figure 2:
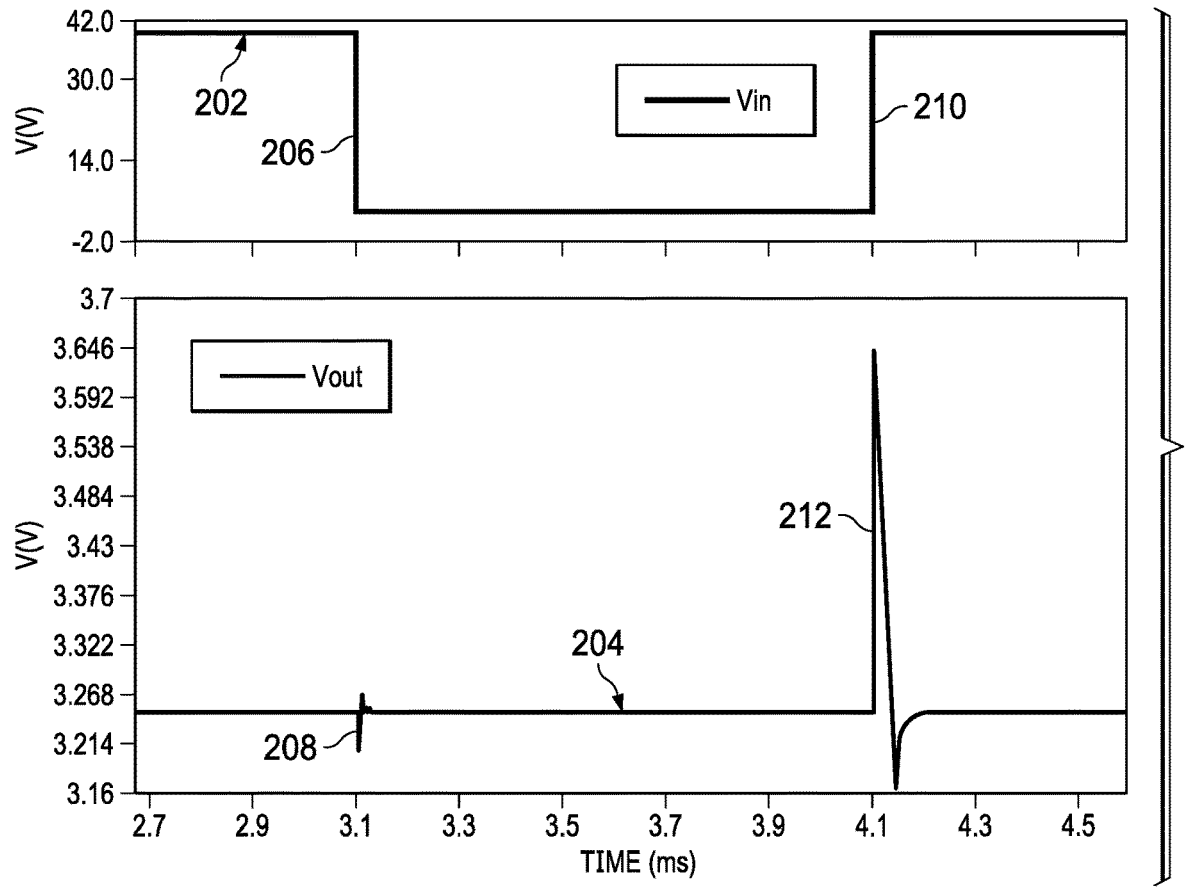
FIG. 2 is a graph of output of the linear voltage regulator of FIG. 1 responsive to a power supply transient.

FIG. 2 is a graph of output of the linear voltage regulator circuit 100 responsive to a transient at the input terminal 102. In FIG. 2, the nominal power supply voltage 202 (voltage at the input terminal 102) is 40 volts, and the nominal output voltage 204 of the linear voltage regulator circuit 100 (voltage at the output terminal 104) is about 3.25 volts. When the power supply voltage 202 drops from 40 volts to 4 volts at edge 206, the linear voltage regulator circuit 100 produces a relatively small transient 208 of about 40 millivolts (an undershoot transient) on the output voltage 204. When the power supply voltage 202 rises from 4 volts to 40 volts at edge 210, the linear voltage regulator circuit 100 produces a relatively large transient 212 (>400 millivolts) (an overshoot transient) on the output voltage 204. The transient 212 may exceed a maximum specified deviation from the desired output voltage.

The linear voltage regulators described herein provide improved power supply transient response by modulating the threshold voltage of a buffer transistor of the linear voltage regulator through a low-pass filter. The low-pass filter modulates the threshold voltage of the buffer transistor relative to the pass transistor that is controlled by the buffer transistor. The modulation improves the drive of the pass transistor during power supply transients, which reduces output perturbations of the linear voltage regulator. The circuitry in the linear voltage regulator reduces output transients, is area efficient, and consumes no quiescent current.

Figure 3:
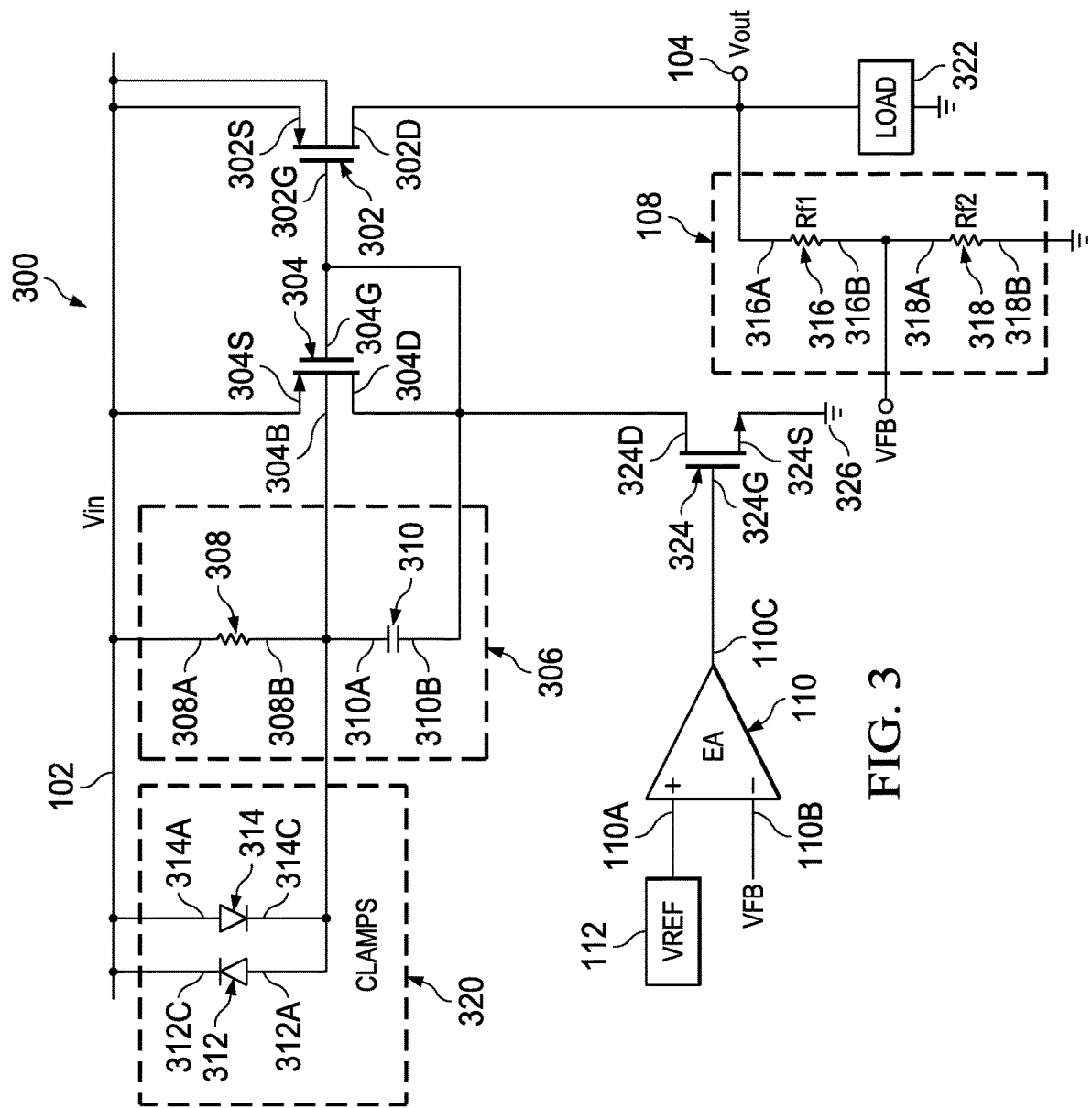
FIGS. 3 and 4 are schematic level diagrams of linear voltage regulators that include threshold voltage modulation to reduce output transients.

FIG. 3 is a schematic level diagram of a linear voltage regulator 300 that includes threshold voltage modulation to reduce output transients. The linear voltage regulator 300 includes the input terminal 102, the output terminal 104, a pass transistor 302, a buffer transistor 304, a low-pass filter 306, a clamp circuit 320, the voltage divider 108, the error amplifier 110, the reference voltage circuit 112, and a buffer transistor 324. The pass transistor 302 passes current from the input terminal 102 to the output terminal 104 to maintain a desired voltage at the output terminal 104. The buffer transistor 304 is coupled to the pass transistor 302 and controls current flow in the buffer transistor 304. The pass transistor 302 and the buffer transistor 304 may be p-channel field effect transistors (PFETS). A source terminal 302S of the pass transistor 302 is coupled to the input terminal 102. A drain terminal 302D of the pass transistor 302 is coupled to the output terminal 104 to drive a load 322. A gate terminal 302G of the pass transistor 302 is coupled to a drain terminal 304D of the buffer transistor 304. A source terminal 304S of the buffer transistor 304 is coupled to the input terminal 102.

A gate terminal 304G of the buffer transistor 304 is coupled to the drain terminal 304D of the buffer transistor 304. A body terminal 304B of the buffer transistor 304 is coupled to the low-pass filter 306 and the clamp circuit 320. The low-pass filter 306 modulates the threshold voltage of the buffer transistor 304 relative to the threshold voltage of the pass transistor 302 responsive to a transient at the input terminal 102. The low-pass filter 306 includes a resistor 308 and a capacitor 310. As the voltage at the input terminal 102 increases, during a positive power supply transient, the body diode of the buffer transistor 304 turns on, reducing the threshold voltage and gate-to-source voltage of the pass transistor 302 and the buffer transistor 304, which reduces overshoot at the output terminal 104. Similarly, for negative power supply transients, the gate-to-source voltage of the pass transistor 302 and the buffer transistor 304 increases to reduce undershoot at the output terminal 104. The resistor 308 includes a terminal 308A coupled to the input terminal 102 and a terminal 308B coupled to the body terminal 304B of the buffer transistor 304. The capacitor 310 includes a terminal 310A coupled to the body terminal 304B of the buffer transistor 304 and a terminal 310B coupled to the drain terminal 304D of the buffer transistor 304.

The clamp circuit 320 is coupled to the input terminal 102 and the body terminal 304B to limit the voltage at the body terminal 304B. The clamp circuit 320 includes a diode 312 and a diode 314. An anode terminal 312A of the diode 312 is coupled to the body terminal 304B of the buffer transistor 304. A cathode terminal 312C of the diode 312 is coupled to the input terminal 102. An anode terminal 314A of the diode 314 is coupled to the input terminal 102. A cathode terminal 314C of the diode 314 is coupled to the body terminal 304B of the buffer transistor 304.

The voltage divider 108 is coupled to the output terminal 104, and scales the voltage at the output terminal 104 for comparison to the reference voltage generated by the reference voltage circuit 112. The voltage divider 108 includes a resistor 316 and a resistor 318. The resistor 316 includes a terminal 316A coupled to the output terminal 104, and terminal 316B coupled to a terminal 318A of the resistor 318. The resistor 318 includes a terminal 318B coupled to a ground terminal 326.

The error amplifier 110 generates a difference voltage as a difference of the voltage provided by the voltage divider 108 and the reference voltage generated by the reference voltage circuit 112. The difference voltage controls the buffer transistor 304 via the buffer transistor 324. The error amplifier 110 includes an input terminal 110A coupled to the reference voltage circuit 112, an input terminal 1106 coupled to the terminal 316B of the resistor 316, and an output terminal 110C coupled to a gate terminal 324G of the buffer transistor 324. A source terminal 324S of the buffer transistor 324 is coupled to the ground terminal 326, and drain terminal 324D of the buffer transistor 324 is coupled to the drain terminal 304D and the gate terminal 304G of the buffer transistor 304.

Figure 4:
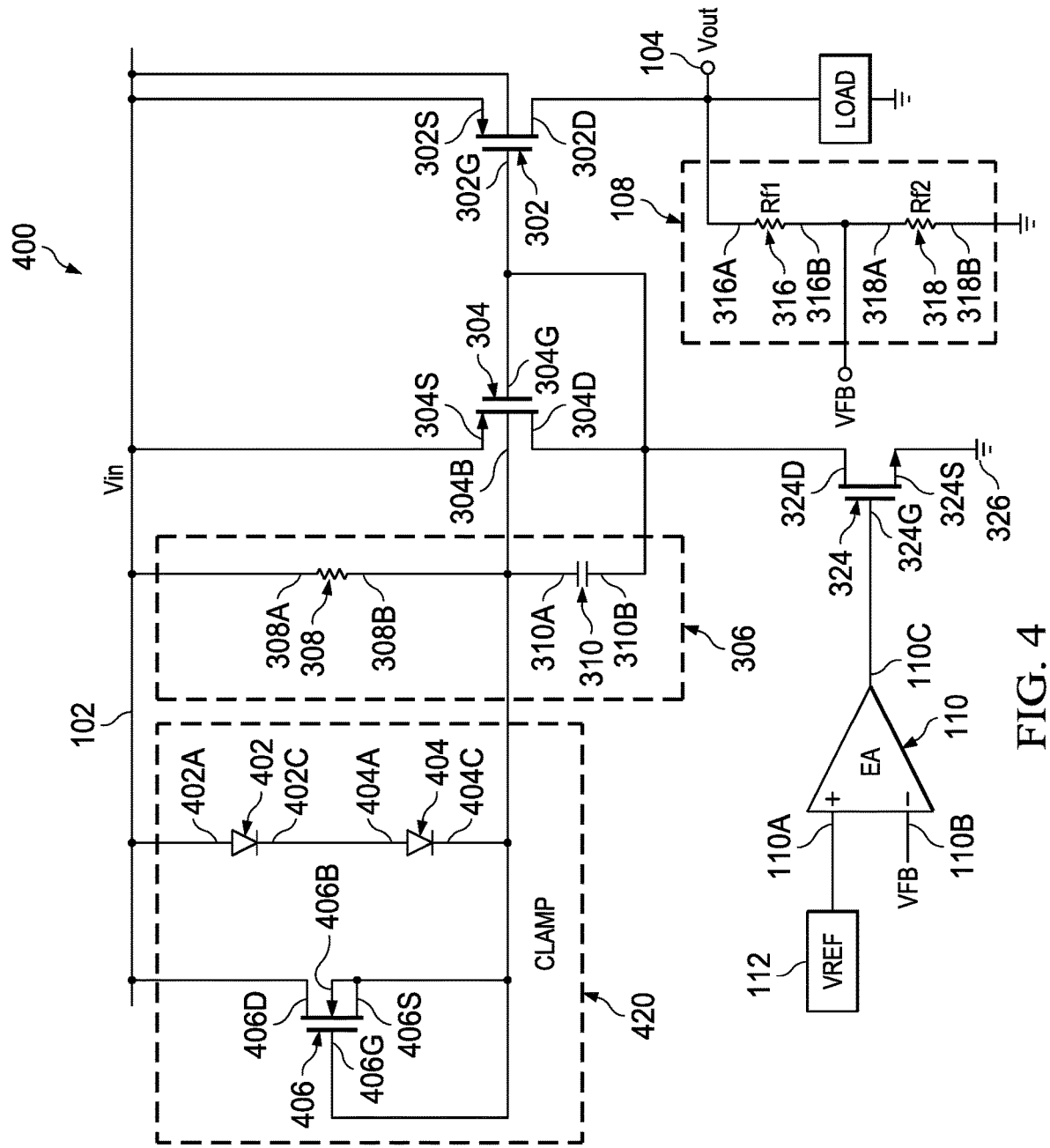

FIG. 4 is a schematic level diagram of another implementation of a linear voltage regulator 400 that includes threshold voltage modulation to reduce output transients. The linear voltage regulator 400 is similar to the linear voltage regulator 300, and includes the input terminal 102, the output terminal 104, the low-pass filter 306, the voltage divider 108, the error amplifier 110, the reference voltage circuit 112, and the buffer transistor 324 connected and operating as described with respect to the linear voltage regulator 300. The linear voltage regulator 300 also includes a clamp circuit 420.

The clamp circuit 420 enables the linear voltage regulator 400 to provide improved power supply transient response in a single direction (positive or negative). The clamp circuit 420, as shown in FIG. 4, enables improved response to positive power supply transients while providing no improvement in response to negative power supply transients. The clamp circuit 420 includes a diode 402, a diode 404, and a transistor 406. The transistor 406 is an n-channel field effect transistor (NFET). The transistor 406 is diode-connected, and ensures that the voltage at the body terminal 304B of the buffer transistor 304 is approximately the voltage at the input terminal 102 when a negative transient occurs on the input terminal 102 to inhibit modulation of the threshold voltage of the buffer transistor 304. When a positive power supply transient occurs, the transistor 406 is almost off, and therefore has little effect on the buffer transistor 304, which allows the threshold voltage of the transistor 406 to be modulated to improve response to the positive power supply transient. The transistor 406 includes a drain terminal 406D coupled to the input terminal 102. A gate terminal 406G and a body terminal 406B of the transistor 406 are coupled to a source terminal 406S of the transistor 406 and the body terminal 304B of the buffer transistor 304.

In some implementations of the clamp circuit 420, the gate terminal 406G and the body terminal 406B of the transistor 406 are connected to the drain terminal 406D of the transistor 406 to enable improved response to negative power supply transients with no effect on response to positive power supply transients.

The diode 402 and the diode 404 are connected in series between the input terminal 102 and the body terminal 304B. An anode terminal 402A of the diode 402 is coupled to the input terminal 102. A cathode terminal 402C of the diode 402 is coupled to an anode terminal of the 404A of the diode 404. A cathode terminal 404C of the diode 404 is coupled to the body terminal 304B of the buffer transistor 304.

FIG. 5 is a graph of output of the linear voltage regulator 300 or the linear voltage regulator 400 responsive to a power supply transient. The power supply transients shown in FIG. 5 are the same as in FIG. 2. The nominal power supply voltage 202 is about 40 volts, and the nominal output voltage 504 of the linear voltage regulator 400 is about 3.25 volts. When the power supply voltage 202 drops from 40 volts to 4 volts at edge 206, the linear voltage regulator 400 produces a relatively small transient 508 (an undershoot transient of about −40 millivolts) on the output voltage 504. When the power supply voltage 202 rises from 4 volts to 40 volts at edge 210, the linear voltage regulator 400 produces a relatively small transient 512 of about 40 millivolts (an overshoot transient) on the output voltage 504. The transient 512 produced by the linear voltage regulator 400 is much smaller than the transient 212 produced by the linear voltage regulator circuit 100.

Figure 6A:
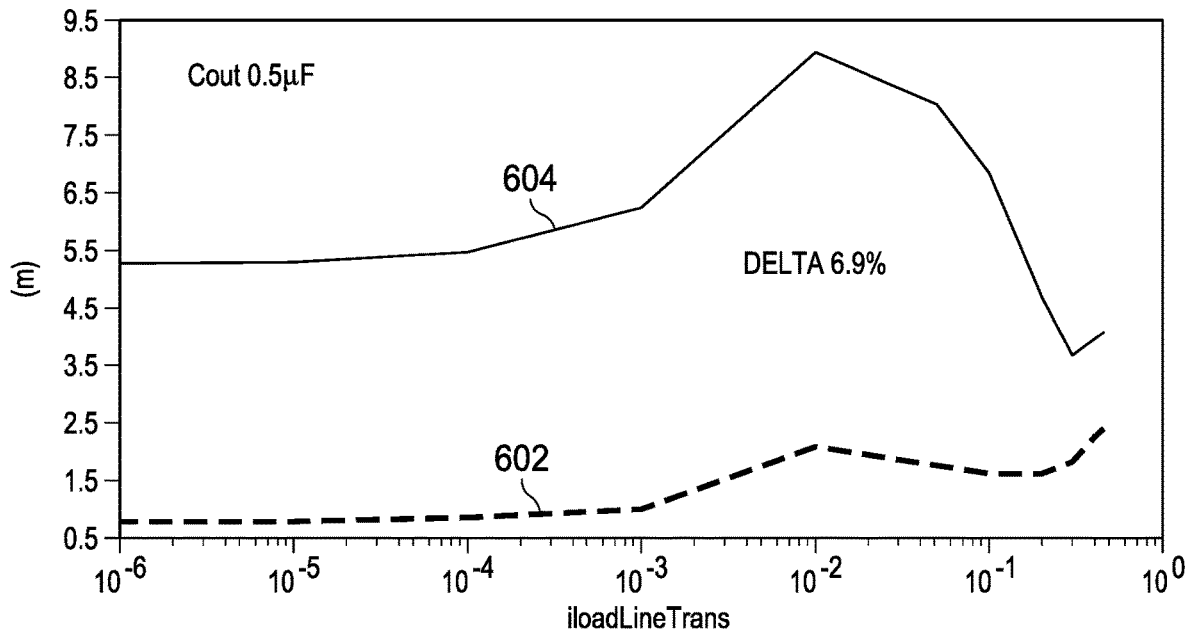
Figure 6B:
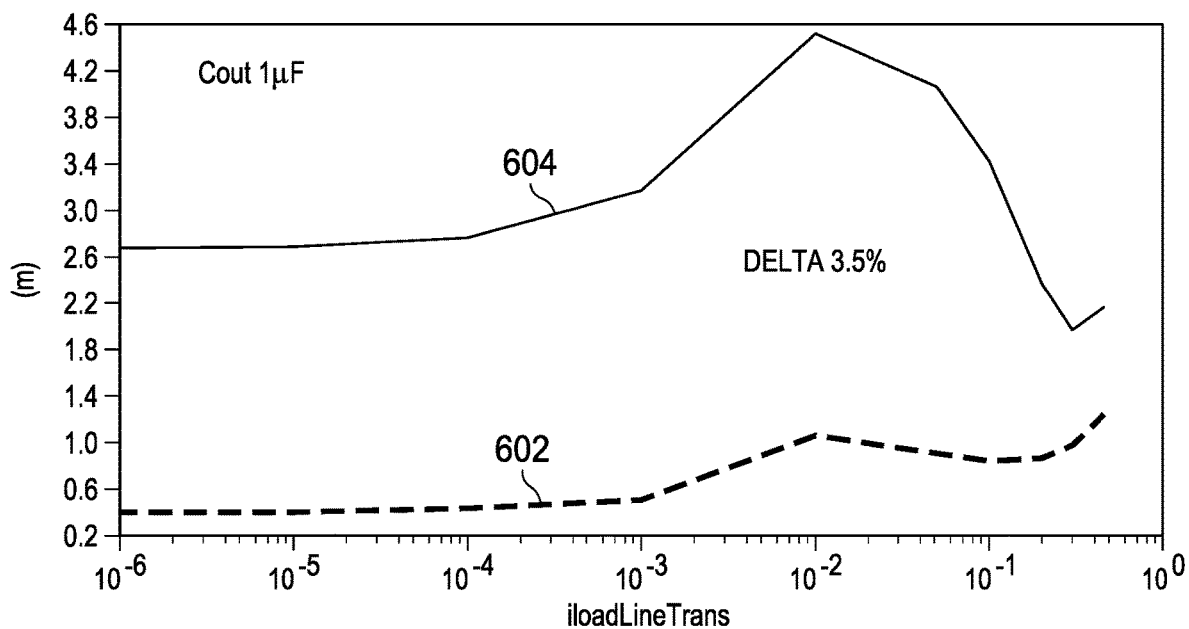

FIGS. 6A-6D show comparisons of line transient overshoot in the linear voltage regulators 300 or 400 to the linear voltage regulator circuit 100. In FIGS. 6A-6D, curve 602 tracks transient overshoot in the linear voltage regulator 300 or the linear voltage regulator 400, and curve 604 tracks transient overshoot in the linear voltage regulator circuit 100 as a percentage of the desired voltage at the output terminal 104 for a transition from 4.3 volts to 13.5 volts at the input terminal 102. FIG. 6A shows transient overshoot with 0.5 microfarads (uF) of output capacitance (capacitance of the capacitor 114). FIG. 6B shows transient overshoot with 1 uF of output capacitance. FIG. 6C shows transient overshoot with 10 uF of output capacitance. FIG. 6D shows transient overshoot with 100 uF of output capacitance. Transient overshoot performance of the linear voltage regulator 300 and the linear voltage regulator 400 is significantly better than that of the linear voltage regulator circuit 100, especially with smaller values of output capacitance.

Figure 7A:
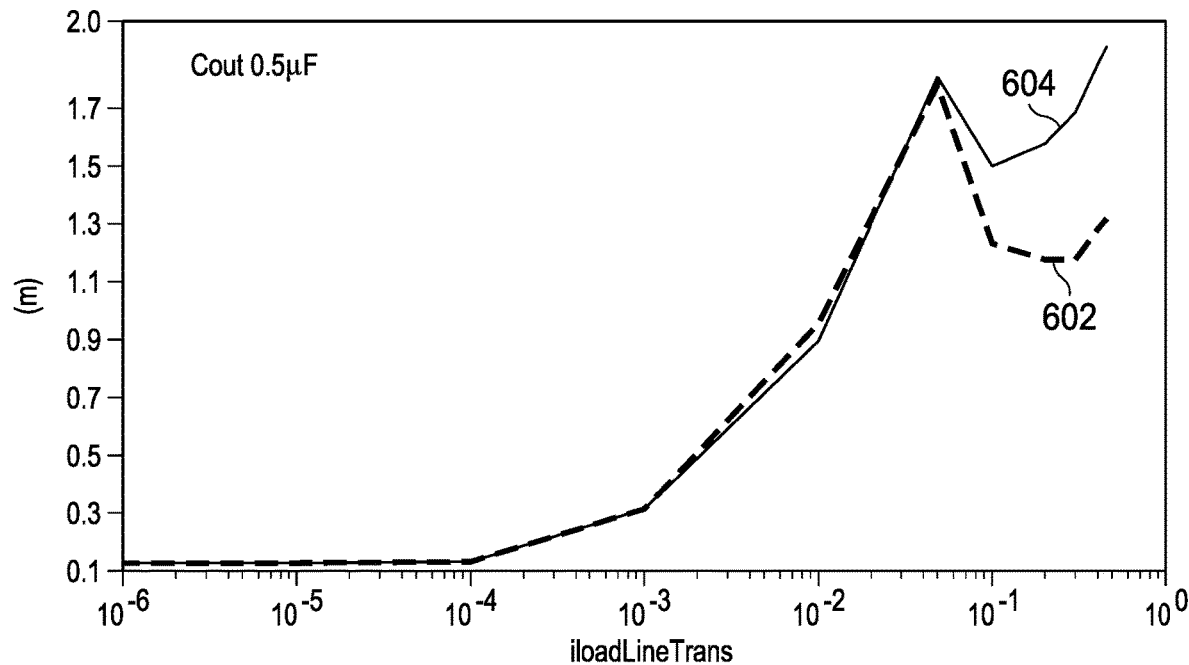
FIGS. 7A-7D show comparisons of line transient undershoot in the linear voltage regulators of FIGS. 3 and 4 to a linear voltage regulator that lacks threshold voltage modulation.
Figure 7B:
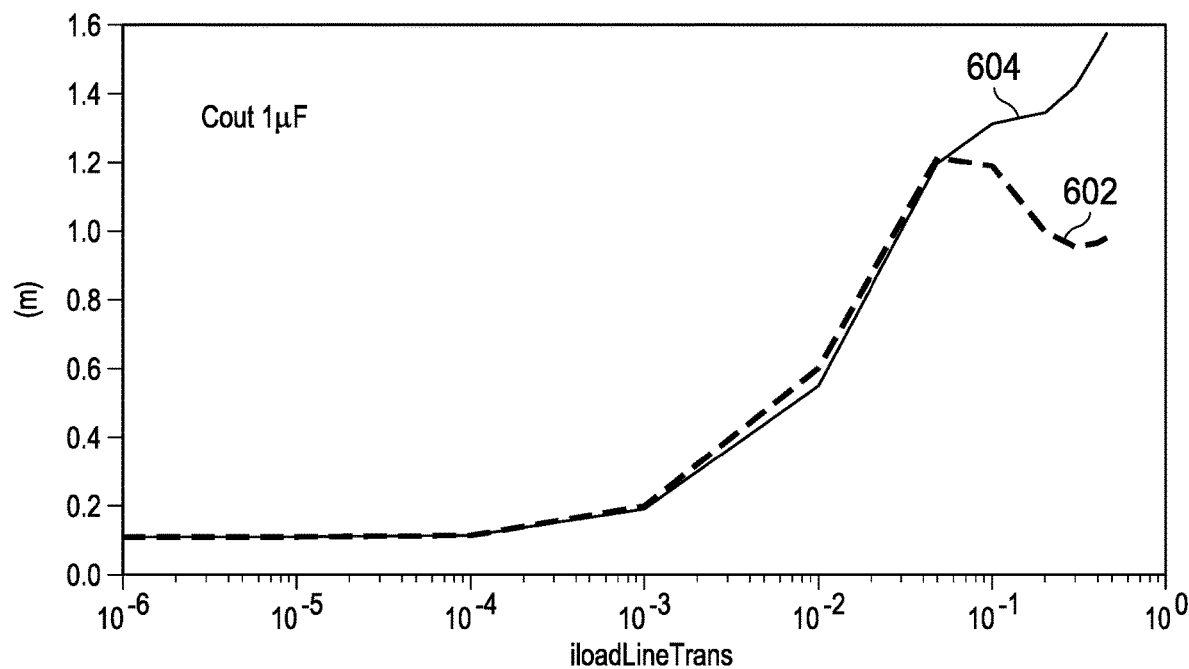
Figure 7C:
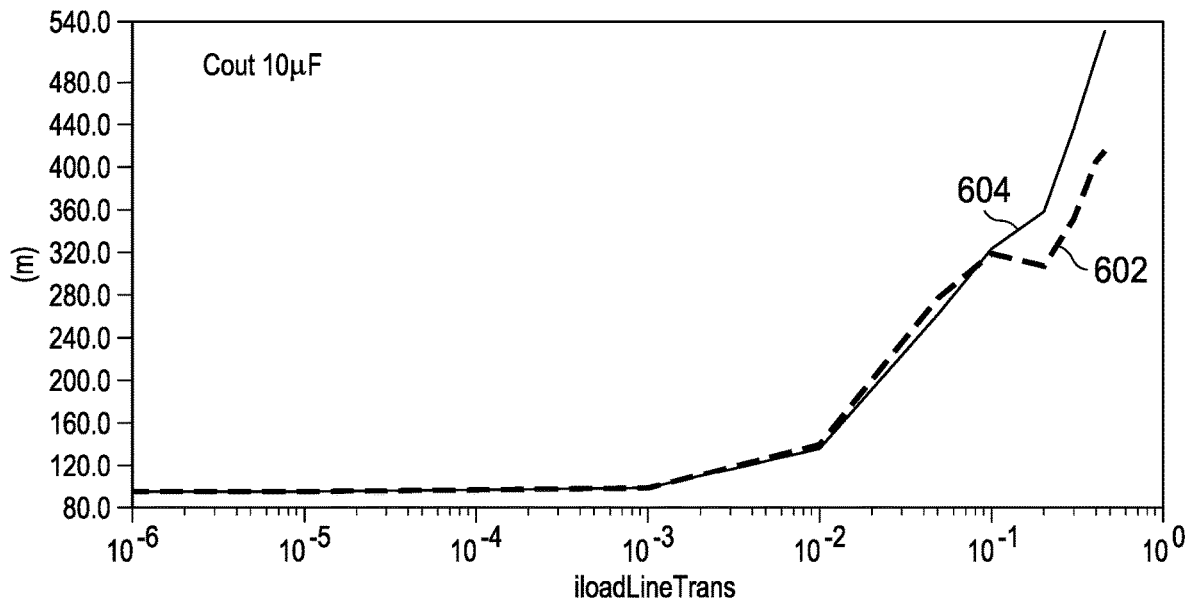
Figure 7D:
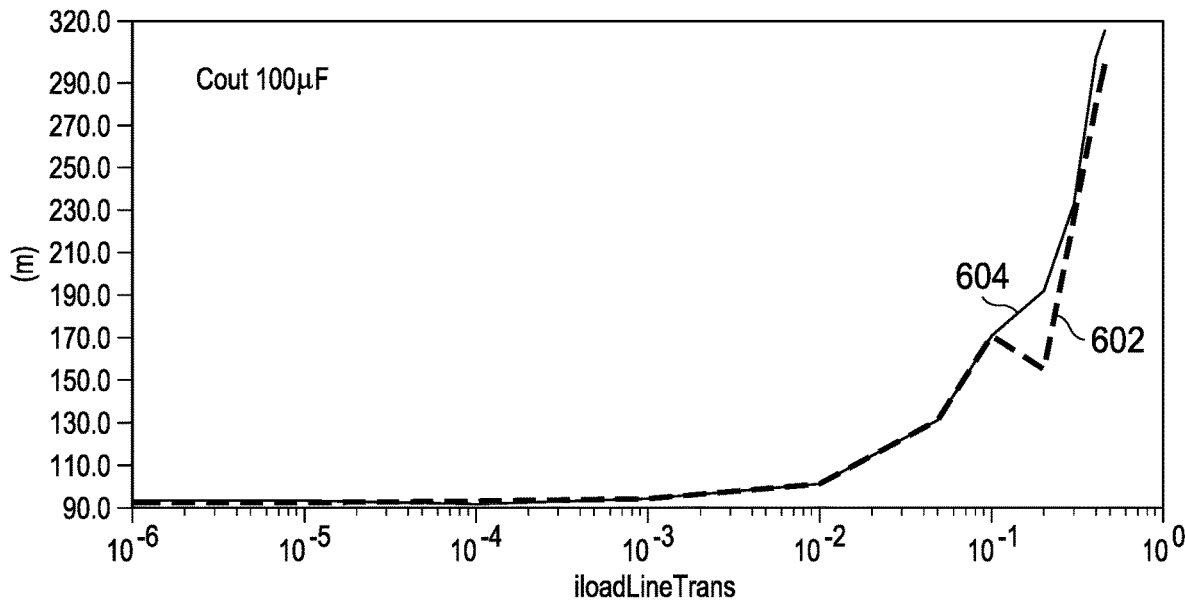

FIGS. 7A-7D show comparisons of line transient undershoot in the linear voltage regulators 300 or 400 to the linear voltage regulator circuit 100. In FIGS. 7A-7D, curve 602 tracks transient undershoot in the linear voltage regulator 300 or the linear voltage regulator 400, and curve 604 tracks transient undershoot in the linear voltage regulator circuit 100 as a percentage of the desired voltage at the output terminal 104 for a transition from 13.5 volts to 4.3 volts at the input terminal 102. FIG. 7A shows transient undershoot with 0.5 uF of output capacitance (capacitance of the capacitor 114). FIG. 7B shows transient undershoot with 1 uF of output capacitance. FIG. 7C shows transient undershoot with 10 uF of output capacitance. FIG. 7D shows transient undershoot with 100 uF of output capacitance. Undershoot performance of the linear voltage regulator 300 and the linear voltage regulator 400 is similar to that of the linear voltage regulator circuit 100, with the linear voltage regulator 300 and linear voltage regulator 400 providing better performance at higher loads.

Figure 8:
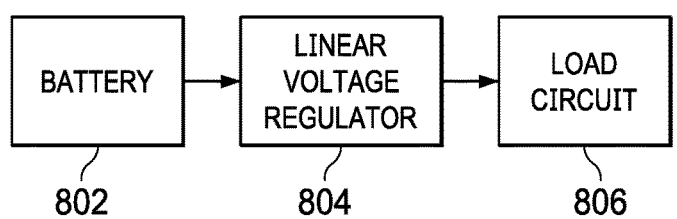
FIG. 8 is a block diagram of an automotive power system that includes a linear voltage regulator that includes threshold voltage modulation to reduce the effects of power supply transients.

FIG. 8 is a block diagram of an automotive power system 800. The automotive power system 800 includes a battery 802, a linear voltage regulator 804, and a load circuit 806. The battery 802 is coupled to, and powers, the linear voltage regulator 804. The linear voltage regulator 804 is coupled to, and powers, the load circuit 806. The linear voltage regulator 804 is an implementation of the linear voltage regulator 300 or the linear voltage regulator 400.

In this description, the term "couple" may cover connections, communications, or signal paths that enable a functional relationship consistent with this description. For example, if device A generates a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal generated by device A.

Modifications are possible in the described embodiments, and other embodiments are possible, within the scope of the claims.

What is claimed is:

1. A linear regulator comprising:
  a first field effect transistor (FET) having a gate and first and second terminals;
  a second FET having a gate, first and second terminals, and a body terminal, the first terminal of the second FET coupled to the first terminal of the first FET, the second terminal of the second FET coupled the gate of the second FET and to the gate of the first FET;
  a resistor having first and second terminals, the first terminal of the resistor coupled to the body terminal of the second FET, the second terminal of the resistor coupled to the first terminals of the first and second FETs; and
  a capacitor having first and second terminals, the second terminal of the capacitor coupled to the second terminal of the second FET and to the gates of the first and second FETs, the first terminal of the capacitor coupled to the first terminal of the resistor and to the body terminal of the second FET.

2. The linear regulator of claim 1, further comprising:
  a first diode having an anode and a cathode, the anode coupled to the second terminal of the resistor and to the first terminals of the first and second FETs, and the cathode coupled to the body terminal of the second FET and to the first terminals of the resistor and the capacitor; and
  a second diode having an anode and a cathode, the anode of the second diode coupled to the body terminal of the second FET, to the cathode of the first diode and to the first terminals of the resistor and the capacitor, and the cathode of the second diode coupled to the second terminal of the resistor, to the anode of the first diode and to the first terminals of the first and second FETs.

3. The linear regulator of claim 1, further comprising:
  a third FET having first and second terminals and a gate, the first terminal of the third FET coupled to the second terminal of the resistor and to the first terminals of the first and second FETs, the second terminal and the gate of the third FET coupled to the body terminal of the second FET and to the first terminals of the resistor and the capacitor;
a first diode having an anode and a cathode, the anode coupled to the second terminal of the resistor and to the first terminals of the first, second, and third FETs; and
a second diode having an anode and a cathode, the anode of the second diode coupled to the cathode of the first diode, and the cathode of the second diode coupled to the body terminal of the second FET, to the first terminals of the resistor and the capacitor, and to the second terminal and the gate of the third FET.

4. The linear regulator of claim 1, further comprising:
a diode having an anode and a cathode, the anode coupled to the second terminal of the resistor and to the first terminals of the first and second FETs, and the cathode coupled to the body terminal of the second FET and to the first terminals of the resistor and the capacitor.

5. The linear regulator of claim 1, further comprising:
a diode having an anode and a cathode, the anode coupled to the body terminal of the second FET and to the first terminals of the resistor and the capacitor, and the cathode coupled to the second terminal of the resistor and to the first terminals of the first and second FETs.

6. The linear regulator of claim 1, further comprising:
a third FET having first and second terminals and a gate, the first terminal of the third FET coupled to the second terminal of the resistor and to the first terminals of the first and second FETs, the second terminal and the gate of the third FET coupled to the body terminal of the second FET and to the first terminals of the resistor and the capacitor.

7. The linear regulator of claim 1, further comprising: a first diode having an anode and a cathode, the anode coupled to the second terminal of the resistor and to the first terminals of the first and second FETs; and a second diode having an anode and a cathode, the anode of the second diode coupled to the cathode of the first diode, and the cathode of the second diode coupled to the body terminal of the second FET and to the first terminals of the resistor and the capacitor.

8. The linear regulator of claim 1, further comprising:
a voltage divider having first, second, and third terminals, the first terminal of the voltage divider coupled to the second terminal of the first FET, and the second terminal of the voltage divider coupled to a ground terminal;
a reference voltage circuit; and
an error amplifier having first and second input terminals and an output terminal, the first input terminal coupled to the reference voltage circuit, and the second input terminal coupled to the third terminal of the voltage divider.

9. The linear regulator of claim 8, further comprising:
a third FET having first and second terminals and a gate, the first terminal of the third FET coupled to the second terminal and the gate of the second FET and to the second terminal of the capacitor, the gate of the third FET coupled to the output terminal of the error amplifier, and the second terminal of the third FET coupled to the ground terminal.

10. A linear regulator, comprising: a first transistor having a control terminal and first and second terminals; a second transistor having a control terminal, first and second terminals, and a body terminal, the first terminal of the second transistor coupled to the first terminal of the first transistor, the second terminal of the second transistor coupled the control terminal of the second transistor and to the control terminal of the first transistor; a resistor having first and second terminals, the first terminal of the resistor coupled to the body terminal of the second transistor, the second terminal of the resistor coupled to the first terminals of the first and second transistors; and a capacitor having first and second terminals, the second terminal of the capacitor coupled to the second terminal of the second transistor and to the control terminals of the first and second transistors, the first terminal of the capacitor coupled to the first terminal of the resistor and to the body terminal of the second transistor.

11. The linear regulator of claim 10, further comprising:
a first diode having an anode and a cathode, the anode coupled to the second terminal of the resistor and to the first terminals of the first and second transistors, and the cathode coupled to the body terminal of the second transistor and to the first terminals of the resistor and the capacitor; and
a second diode having an anode and a cathode, the anode of the second diode coupled to the body terminal of the second transistor, to the cathode of the first diode and to the first terminals of the resistor and the capacitor, and the cathode of the second diode coupled to the second terminal of the resistor, to the anode of the first diode and to the first terminals of the first and second transistors.

12. The linear regulator of claim 10, further comprising:
a third transistor having first and second terminals and a control terminal, the first terminal of the third transistor coupled to the second terminal of the resistor and to the first terminals of the first and second transistors, the second terminal and the control terminal of the third transistor coupled to the body terminal of the second transistor and to the first terminals of the resistor and the capacitor;
a first diode having an anode and a cathode, the anode coupled to the second terminal of the resistor and to the first terminals of the first, second, and third transistors; and
a second diode having an anode and a cathode, the anode of the second diode coupled to the cathode of the first diode, and the cathode of the second diode coupled to the body terminal of the second transistor, to the first terminals of the resistor and the capacitor, and to the second terminal and the control terminal of the third transistor.

13. The linear regulator of claim 10, further comprising:
a voltage divider coupled to the second terminal of the first transistor and having an output;
a reference voltage circuit having an output and configured to generate a reference voltage; and
an error amplifier having a first input coupled to the output of the voltage divider, having a second input coupled to the output of the reference voltage circuit, and configured to generate a difference voltage based on a difference between the reference voltage and a voltage at the output of the voltage divider.

14. The linear regulator of claim 13, further comprising:
a third transistor having a control terminal and first and second terminals, the first terminal of the third transistor coupled to the second terminals of the capacitor and the second transistor and to the control terminals of the first and second transistors, the control terminal of the third transistor coupled to the output of the error amplifier.

15. A circuit comprising:
a first transistor having first and second terminals and a control terminal;
a second transistor having first and second terminals, a control terminal, and a body terminal, the first terminal of the second transistor coupled to the first terminal of the first transistor, the second terminal and the control terminal of the second transistor coupled to the control terminal of the first transistor; and
a resistor having first and second terminals, the first terminal of the resistor coupled to the body terminal of the second transistor, the second terminal of the resistor coupled to the first terminals of the first and second transistors;
a capacitor having first and second terminals, the second terminal of the capacitor coupled to the second terminal of the second transistor and to the control terminals of the first and second transistors, the first terminal of the capacitor coupled to the first terminal of the resistor and to the body terminal of the second transistor;
a voltage divider having first, second, and third terminals, the first terminal of the voltage divider coupled to the second terminal of the first transistor, and the second terminal of the voltage divider coupled to a ground terminal;
a reference voltage circuit;
an error amplifier having first and second input terminals and an output terminal, the first input terminal coupled to the reference voltage circuit, and the second input terminal coupled to the third terminal of the voltage divider; and
a third transistor having a control terminal and first and second terminals, the first terminal of the third transistor coupled to the second terminals of the capacitor and the second transistor and to the control terminals of the first and second transistors, the control terminal of the third transistor coupled to the output of the error amplifier.

16. The circuit of claim 15, further comprising: a first diode having an anode and a cathode, the anode coupled to the second terminal of the resistor and to the first terminals of the first and second transistors, and the cathode coupled to the body terminal of the second transistor and to the first terminals of the resistor and the capacitor; a second diode having an anode and a cathode, the anode of the second diode coupled to the body terminal of the second transistor, to the cathode of the first diode and to the first terminals of the resistor and the capacitor, and the cathode of the second diode coupled to the second terminal of the resistor, to the anode of the first diode and to the first terminals of the first and second transistors.

17. The circuit of claim 15, further comprising:
a field effect transistor (FET) having first and second terminals and a gate, the first terminal of the FET coupled to the second terminal of the resistor and to the first terminals of the first and second transistors, the second terminal and the gate of the FET coupled to the body terminal of the second transistor and to the first terminals of the resistor and the capacitor.

18. The circuit of claim 17, further comprising: a first diode having an anode and a cathode, the anode coupled to the second terminal of the resistor, to the first terminals of the first and second transistors and to the first terminal of the FET; and a second diode having an anode and a cathode, the anode of the second diode coupled to the cathode of the first diode, and the cathode of the second diode coupled to the body terminal of the second transistor, to the first terminals of the resistor and the capacitor, and to the second terminal and the gate of the FET.

* * * * *